United States Patent [19]

Szekely et al.

[11] 4,306,901
[45] Dec. 22, 1981

[54] PROCESS FOR FORMING STEEL PRODUCT FROM IRON WHILE AVOIDING THE LIQUID STATE

[75] Inventors: Julian Szekely, Weston; Gregory J. Yurek, Melrose, both of Mass.

[73] Assignee: Massachusetts Institute of Technology, Cambridge, Mass.

[21] Appl. No.: 153,804

[22] Filed: May 27, 1980

[51] Int. Cl.³ .............................................. B22F 1/00
[52] U.S. Cl. ................................. 75/0.5 BA; 75/1 R; 75/2; 75/34; 148/16.5; 148/126
[58] Field of Search ......................................... 75/3–5, 75/29, 33–445, 211, 213, 214, 1 R, 1 T, 2, 0.5 BA; 148/16, 16.5, 126

[56] References Cited

U.S. PATENT DOCUMENTS

| | | | |
|---|---|---|---|
| 2,947,620 | 8/1960 | Whitehouse et al. | 75/0.5 BA |
| 3,122,434 | 2/1964 | Reed et al. | 148/12 R |
| 3,144,329 | 8/1964 | Frölich et al. | 75/214 |
| 4,089,681 | 5/1978 | Gueussier | 75/3 |

FOREIGN PATENT DOCUMENTS 2841109  4/1979  Fed. Rep. of Germany ............ 75/5

OTHER PUBLICATIONS

McGannon, H.; *The Making, Shaping and Treating of Steel* 8th edition, U.S. Steel, pp. 185–187, 381.
Sugasawa, K., et al. "Direktreduktion von Hüttenwevksstäuben" *Stahlu Eisen* vol. 96, No. 24 (12/76).

Primary Examiner—Michael L. Lewis
Attorney, Agent, or Firm—Arthur A. Smith, Jr.; Paul J. Cook

[57] ABSTRACT

Steel is made from iron ore by comminuting the ore and recovering a particle fraction which has a size less than 50 microns. The iron rich particles then are reduced to form iron or magnetite and are beneficiated by magnetic separation. The magnetite particles are further reduced to form small size iron particles. The iron powders produced by these processes are then processed by powder metallurgical techniques.

4 Claims, 3 Drawing Figures

PROCESS FOR FORMING STEEL PRODUCT FROM IRON WHILE AVOIDING THE LIQUID STATE

BACKGROUND OF THE INVENTION

This invention relates to a process for making steel from iron ore without proceeding through the liquid state.

Presently, steel is produced in five basic stages from raw material comprising: raw material preparation and coke making, iron making, steel making, casting and primary rolling and finishing. In the raw materials preparation step, the ores, essentially iron oxides containing some impurities, are agglomerated into particles at least roughly the size of small marbles before they are introduced into blast furnaces. These particles generally are mixtures of fine ore particles, lime stone and other material made to undergo partial fusion. The coke is made from ground coal heated in the absence of air to drive off volatile matter, moisture and sulfur. The resultant metallurgical coke is utilized as a reducing agent and as a fuel in iron making. Iron making is conducted in iron blast furnaces wherein iron ore, (sinter or pellets), a flux (lime stone) and metallurgical coke are charged at the top while preheated air is blown into the system at the bottom. Oxygen and minerals are removed from the iron ores, reducing them to metallic iron during their descent through the blast furnace. As an alternative to the blast furnace, a direct reduction process can be utilized wherein iron ore pellets are contacted within an ascending flow or reducing gas to form a solid sponge iron which is melted and refined in an electric arc furnace to obtain steel. In the steel making step, the metal obtained from the blast furnace by direct reduction is purified by selectively oxidizing impurities such as carbon, silicon, manganese, sulfur and phosphorous. In the open hearth steel making process, hot metal and scrap are heated by burning oil or natural gas in a shallow reverbatory furnace. The present preferred steel making process is the basic oxygen process in which molten iron and scrap are introduced into a pear shaped vessel and then a supersonic oxygen jet is blown into the bath surface. Another alternative involves the use of electric furnaces which can utilize the scrap and/or molten hot metal wherein an arc is struck between electrodes and the metal charge to provide the needed thermal energy to melt the charge and oxidize the impurities within an injected oxygen stream. The steel thus obtained is cast into ingots which are then further processed in primary and finishing rolling mills into the desired shape. Presently, the energy requirement for one ton of steel is about 35 million BTU.

It would be highly desirable to provide a method for making steel from iron ore which materially reduces present commercial energy requirements. More particularly, it would be highly desirable to provide such a process which eliminates the need for processing iron-containing material through the liquid state when making steel.

SUMMARY OF THE INVENTION

This invention provides a method for making steel from iron ore without the need for heating the material being processed to the liquid state. An iron ore is pulverized to form small particles which are separated such as by froth flotation from larger iron ore particles remaining after pulverization. The smaller particles then are reduced in one or a plurality of steps to form metallic iron which is separated from impurities by means of one or more magnetic separation steps. The metallic iron particles then are processed by a powder metallurgy technique to form a finished steel product.

DESCRIPTION OF SPECIFIC EMBODIMENTS

In accordance with the invention, it is necessary that the iron ore to be used be of a high grade, less than about 6 weight % and preferably, less than 5 weight % gangue content after conventional ore dressing, e.g. grinding and benefication processes, e.g. froth flotation. This iron ore has a small particle size, that is, a particle size wherein at least about 70 weight % of the particle has a size less than 50 microns, preferably less than about 30 microns and wherein substantially 100 weight % of the particles have a size less than about 80 microns. Subsequently, the small particles are recovered by any conventional means. A particularly useful particle recovery process comprises froth flotation which is commonly employed for concentrating minerals from ores. In the flotation process, the ore is crushed or wet ground to obtain a pulp. A frothing agent, usually employed with a collecting agent, is added to the ore to assist in separating valuable minerals from the undesired or gangue portions of the ore in subsequent flotation steps. The ore then is aerated to produce a froth at the surface thereof and the collector assists the frothing agent in separating the mineral values from the ore by causing the mineral values to adhere to the bubbles formed during this aeration step. The adherance of the mineral values is selectively accomplished so that the portion of the ore not containing mineral values does not adhere to the bubbles. The mineral bearing froth is collected and further processed to obtain the desired minerals. That portion of the ore which is not carried over with the froth, usually identified as "flotation tailings", is usually not used for the process for extraction of mineral values therefrom. The frothers most widely used in froth flotation operations are compounds containing a non-polar, water repellent group and a single, polar, water-avid group such as hydroxyl (OH).

This particle mixture is then dried and is then separated into two principal fractions using a cyclone bank or other suitable device. The fraction of particles larger than about 30–50 microns is agglomerated into pellets and may be processed by conventional means. The fraction of the particles smaller than about 30–50 microns will contain a much smaller proportion of the impurities and represents the principal feedstock for use in this invention. The principle that the finer particles will contain less impurities is a crucial feature of the invention, which ultimately enables the production of pure iron powder, without resort to elaborate, hydrometallurgical purification steps.

Figure 2:
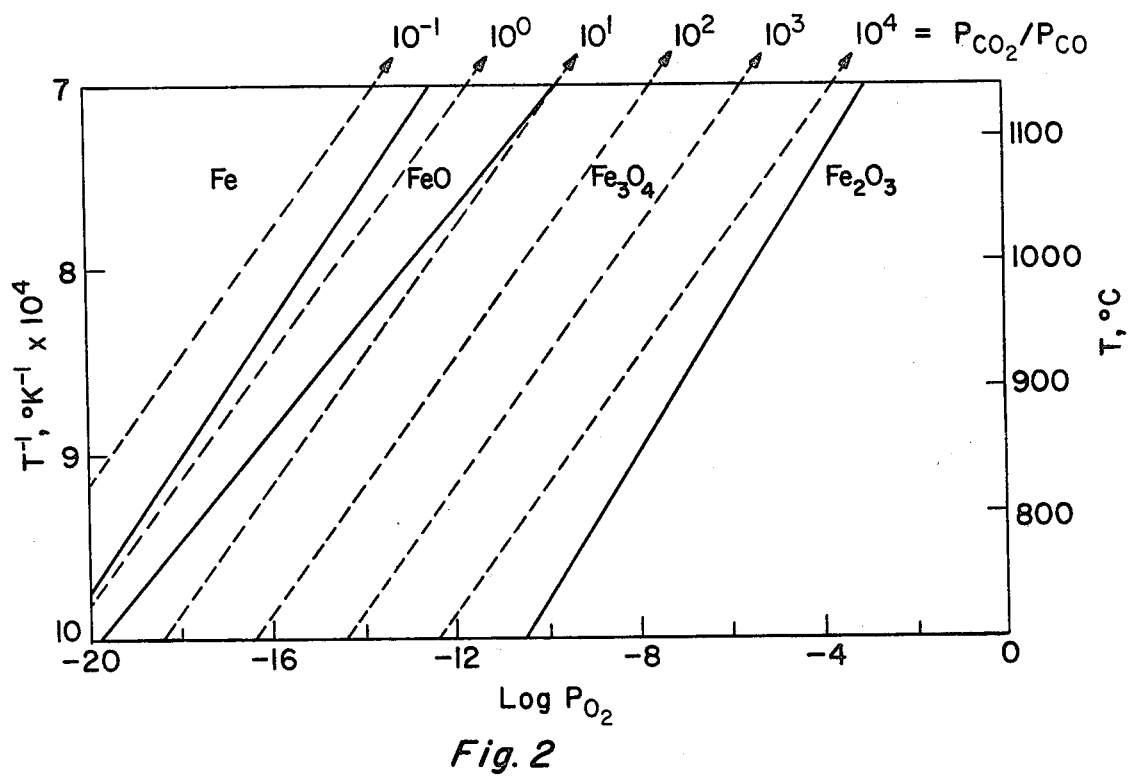
FIG. 2 is a temperature and pressure correlation of reduction.

The stream of fine iron ore particles isolated by the benefication step then are reduced either to metallic iron or to magnetite by contacting the particles with a hot reducing gas such as hydrogen, carbon monoxide or mixtures of hydrogen and carbon monoxide. Generally, this step is conducted in a fluidized bed reaction or in a cyclone furnace or in combination of the two. Reduction can be conveniently effected in a cyclone furnace or in a fluidized bed wherein the reducing gas also functions as a fluidizing gas, or in a combination of the two. When iron powder is the desired end product, the reducing gases should contain less than about 10% by volume of water vapor and/or carbon dioxide and should comprise a mixture of the hydrogen and carbon monoxide in order to maintain the desired reducing conditions. Suitable reduction temperatures are between about 500° C. and 1100° C., preferably between about 900° C. and 1000° C. When the desired end product is magnetite the reaction can be carried out in a similar manner to the process for forming iron powder; but the gas composition would have to be appropriately adjusted, such that the inlet gas composition is in equilibrium with the product magnetite. This equilibrium is governed by the partial pressures of carbon monoxide, carbon dioxide, hydrogen and water vapor, as illustrated in FIG. 2 for $CO+CO_2$ mixtures. In either event, the reduction is conducted under conditions to minimize or prevent particle agglomeration so that the iron or magnetite particles can be separated from the gangue easily. Particle agglomeration can be prevented by operating at a temperature below about 1000° C.

When iron powder is the product of the reduction, this product is subjected to magnetic separation to remove the impurities. When iron powder of high purity is desired, for special applications, the reduction unit would be run in such a manner, that the product stream would be only incompletely reduced such that the product stream would contain some 5–15% residual oxygen combined with the iron. Under these conditions most of the impurities will be concentrated in the less that totally reduced stream, for the following reasons:

(a) the pure iron oxide particles are contained in the the smaller size fraction, which will reduce faster and (b) the presence of the gangue minerals will tend to impede the access of the reducing gases.

When this partially reduced product stream is subjected to magnetic separation the magnetic fraction will contain virtually pure iron; the other stream, which will contain quite high proportion of reduced material, again may be processed in the conventional manner. Typical devices for this magnetic separation include drum separators, area gradient separators, and matrix separators.

In the operation of the magnetic separator the objective is to produce a very pure iron stream. Thus, some of the iron powder produced (about 5–20%) will form a reject stream to be smelted in a conventional manner, using electric arc furnaces.

When the reduction process produces a magnetite powder, this powder is further crushed, size fractionated and then subjected to magnetic separation. The magnetite rich stream then is reduced to metallic iron such as in a fluidized bed or in cyclone furnaces or in a combination of the two. The product again is subjected to magnetic separation in order to remove the residual impurities by means of one or more magnetic separation steps. The metallic iron particles then are processed by a powder metallurgy technique to form a finished steel product.

In an alternative embodiment of this invention, the separated small iron-rich particles obtained by the benefication process can be agglomerated such as into pellets or briquetts. The pellets or briquetts are made in any conventional manner. For example, in making pellets, the iron-rich particles are fed into a pelletizing drum where they are admixed with water and a binder to form wet pellets. The pellets are removed from the drum and heated to remove the water thereby forming dry pellets. When forming briquetts, the iron rich particles are admixed with a binder and the resultant composition is subjected to pressure in a mold. The agglomerated particles then are reduced such as in a conventional shaft furnace or the like by utilizing a reducing gas such as hydrogen, carbon monoxide or mixtures of hydrogen and carbon monoxide containing less than about 10% water vapor or carbon dioxide. Generally reduction of the pellets or briquetts is conducted under the reducing conditions set forth above. The product of this reducing step is a sponge iron which then can be crushed as in a ball mill to yield iron-rich particles having a size of at least 70 weight % below about 50 microns, preferably below about 30 microns and wherein substantially 100% are below 80 microns. This powder than can be subjected to a magnetic separation step in order to remove iron-rich particles at least 99.8% pure from the gangue minerals.

In order to convert the iron rich particles to steel, it is necessary that they be at least about 99.8–99.9% by weight pure iron. The iron particles than are alloyed with carbon to form steel by heating the particles in the presence of carbon monoxide and/or methane in the presence of hydrogen in order to effect carbon migration into the solid particles. The particles are heated to a temperature at which carbon migration into the particles is effected while avoiding agglomeration of the particles, generally between about 800° C. and 1000° C.

The following examples illustrate the present invention and are not intended to limit the same.

Figure 1:
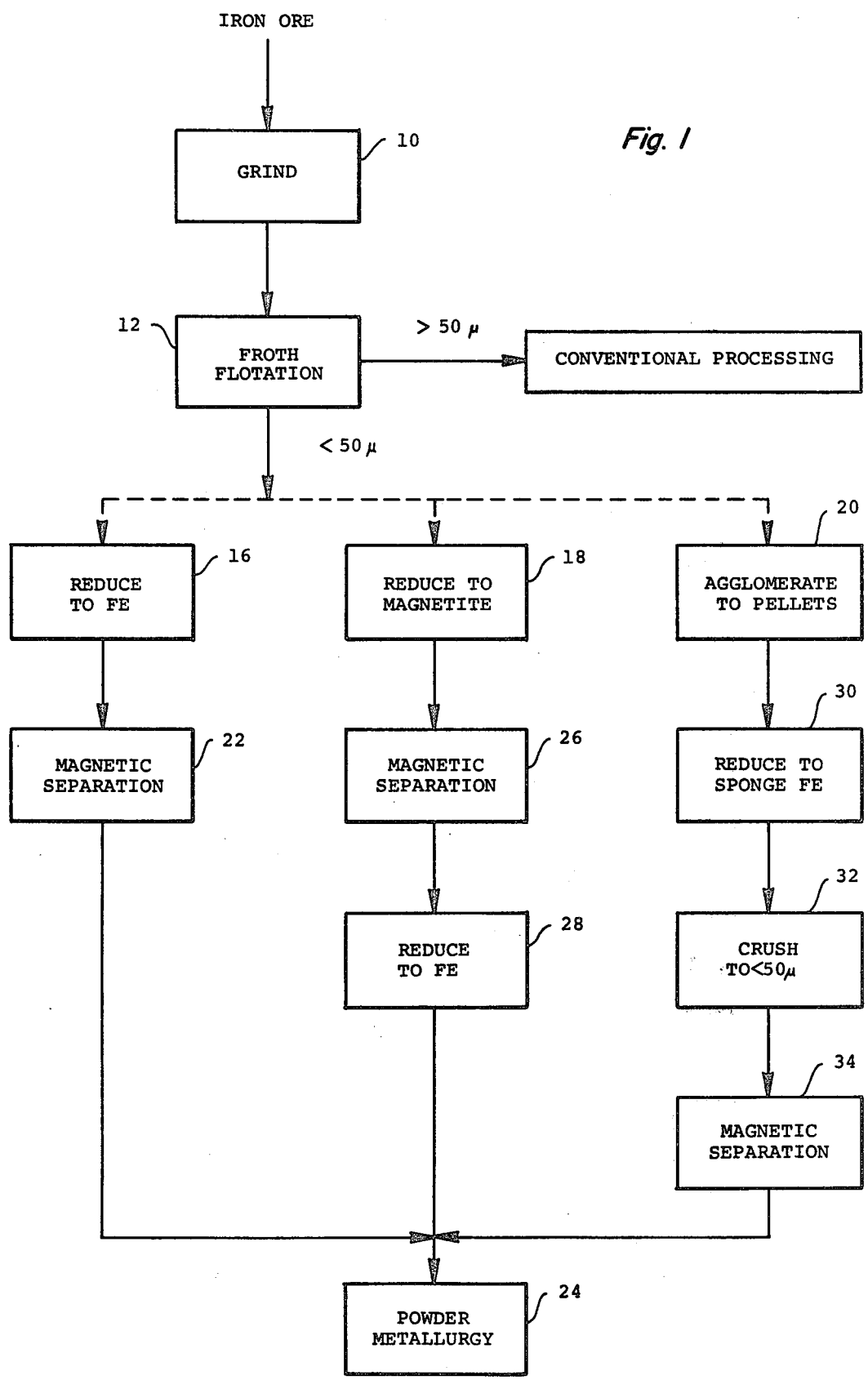
FIG. 1 is a process flow chart.

Referring to FIG. 1, iron ore, such as hematite, containing less than about 6% gangue material is pulverized such as in a grinding step 10. The iron ore particles then are beneficiated such as in a froth flotation step 12 to separate small particles substantially 100% of which are less than 80 microns and at least 70% of which are less than 50 microns. The larger particles obtained from the froth flotation step 12 can be conventionally processed to form steel or can be subjected to a second grinding and froth flotation steps if desired to isolate additional small iron-rich particles. The small particles obtained from the froth flotation step 12 then can be reduced to iron in step 16, reduced to magnetite in step 18 or agglomerated to pellets in step 20. From reducing step 16, the particles are subjected to magnetic separation in step 22 and then are treated by powder metallurgy technique in step 24.

The ore particles reduced in step 18 are then subjected to magnetic separation step 26 to isolate a magnetite-rich particle mixture which is reduced in step 28 to iron. The iron particles then are treated by powder metallurgy in step 24.

The small sized particle directed to agglomerating step 20 are treated to form particles of a conventional size of about ¼–½ inch. These particles then are reduced to sponge iron in step 30 which is then crushed to the desired particles size set forth above in step 32. The ground particles then are subjected to magnetic separation in step 34 to form an iron-rich particle stream which is treated by powder metallurgy in step 24.

Figure 3:
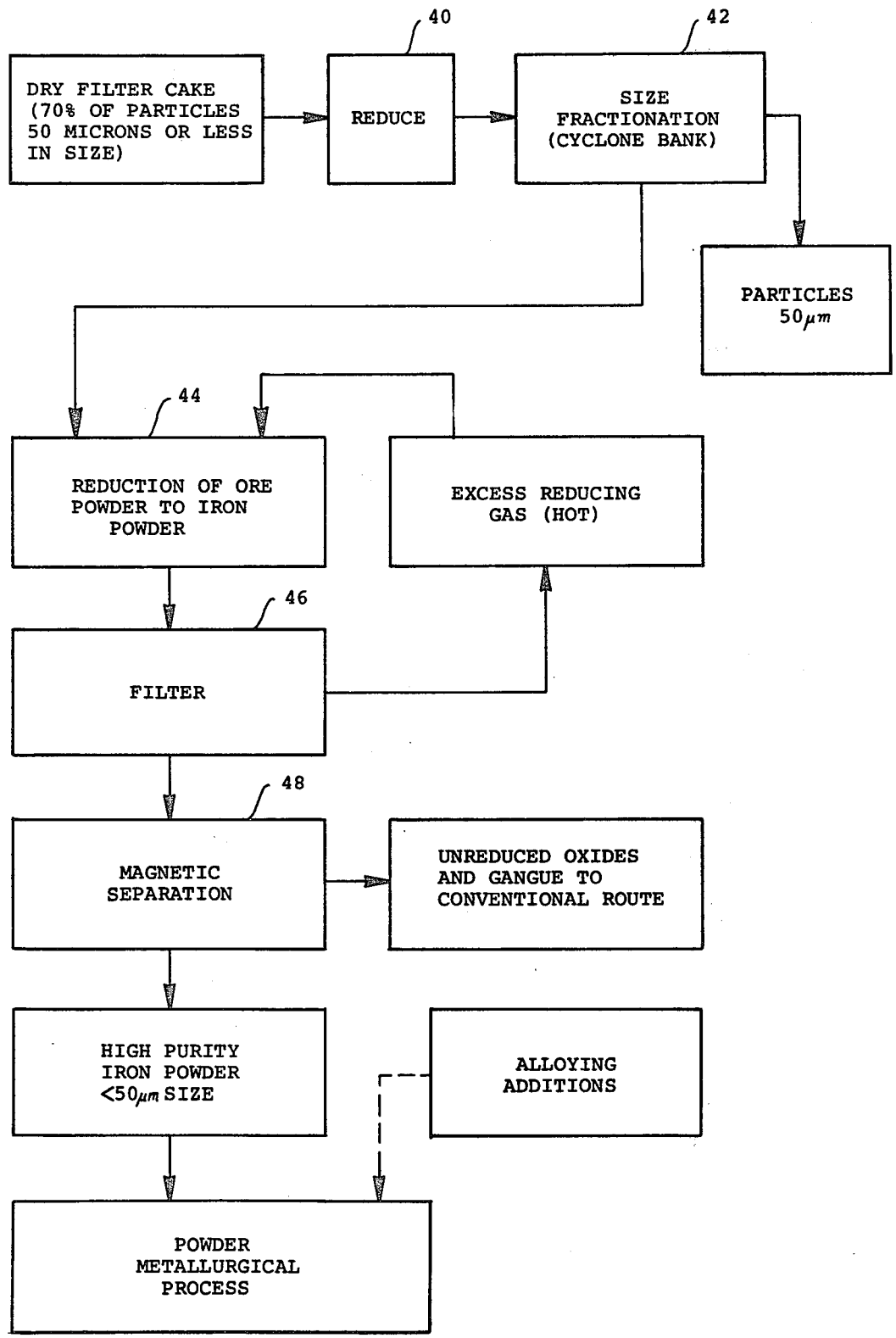
FIG. 3 is an alternative flow chart.

An alternate processing scheme in accordance with this invention is shown in FIG. 3. A dry filter cake of high quality iron ore wherein at least about 70% of the particles are 50 microns or smaller is directed to a reducing step 40 to form magnetite. The reduced particles then are directed to a size separation step 42, e.g. a cyclone bank to isolate and remove particles having a size larger than 50 microns which can be processed conventionally. The small reduced particles then are directed to a second reduction step 44 where the magnetite particles are converted to iron as for example in a cyclone furnace, fluidized bed or a combination of the two. The iron particles are removed from the reducing gas in filtration step 46 and the hot reducing gas is recycled to the second reduction step 44. The fluidized particles then are subjected to one or more magnetic separation steps 48 to separate the iron particles from unreduced oxides and gangue. The high purity iron powder having a size less than about 50 microns then is processed by conventional powder metallurgical processing 50 with or without alloying additives.

We claim:

1. The process for converting iron ore containing less than about 6 weight percent gangue to a steel product without proceeding through the liquid state which comprises pulverizing said iron ore, separating said pulverized iron ore to obtain a particle stream wherein at least about 70 weight percent of the particles have a size less than 50 micron, reducing said iron ore particles to magnetite in a first reducing step, separating the products from the first reducing step by magnetic separation to form a magnetite-rich stream and reducing said magnetite-rich stream to a product containing at least about 99.8 weight percent iron in a second reducing step and alloying said product to form a steel product.

2. The process of claim 1 wherein said iron ore contains less than about 5 weight percent gangue.

3. The process of claim 1 wherein said pulverized iron ore particle stream comprises at least about 70 weight percent particles having a size less than 30 microns.

4. The process of claim 1 wherein said pulverized iron ore is separated by froth flotation.

* * * * *